3,231,527
CURING ORGANOPOLYSILOXANES WITH A COMBINATION OF TRICHLOROACETIC ACID AND DIBUTYL TIN DILAURATE
Louis Frederic Ceyzeriat, Lyon, France, assignor to Rhone-Poulenc, S.A., a French body corporate
No Drawing. Filed Jan. 16, 1961, Ser. No. 82,676
Claims priority, application France, Jan. 25, 1960, 816,582
1 Claim. (Cl. 260—18)

The present invention relates to a process for the rapid curing at ambient temperature of diorganopolysiloxanes which may contain inert fillers.

Various processes have already been proposed for curing diorganopolysiloxanes. In these processes, two compositions are mixed together at the time of use. One of these contains the organopolysiloxane compound, if desired with an addition of fillers, and a cross-linking agent. The other composition contains a curing accelerator, which may be an organic derivative of lead or tin or an amine. The cross-linking agent may be an alkyl mono- or polysilicate, an organopolysiloxane containing silicon-hydrogen bonds, or a titanic ester.

With these processes, the time taken in the setting after the mixing of the above-defined compositions is generally very variable and often rather long, of the order of several hours.

If it is desired to effect a very rapid setting, for example in a period of less than 10 minutes, as is the case in many applications, such as coating and certain moulding operations, it is necessary to use particularly active fillers (for example zinc oxide and certain limestones) as opposed to inert fillers or to use cross-linking agents such as triethoxysilane or methyl hydrogenopolysiloxanes.

The use of fillers having an alkaline reaction or of cross-linking agents capable of liberating hydrogen, as in the case of substances containing Si—H bonds, is quite often undesirable, because these products give rise to disadvantages in the compositions containing them, which disadvantages become apparent either before or after the curing of the mixtures.

It has now been found that diorganopolysiloxanes, which may contain inert fillers, can be rapidly cured with the aid of a polyalkoxysilane as cross-linking agent, if there is employed as the accelerator an organic derivative of tin in combination with mono-, di- or trichloracetic acid. The curing then takes place in a few minutes at atmospheric temperature, i.e. at about 15–30° C.

The diorganopolysiloxanes employed in the process of the invention are linear compounds constituted by units having the formula $R_2SiO$ and are terminated by hydroxyl groups. They are prepared by hydrolysis of bifunctional diorganosilanes of the formula $R_2SiX_2$, free as far as possible from mono- or trifunctional derivatives. In the foregoing formulae, the symbol R denotes any monovalent hydrocarbon group, for instance an alkyl group, for example methyl or ethyl, an alkenyl group, for example vinyl or allyl, a cycloalphatic group, for example cyclohexyl or cyclohexenyl, an aryl group, for example phenyl or tolyl, an aralkyl group, for example benzyl, or a hydrocarbon group, such as those mentioned in the foregoing, containing halogen atoms. X denotes a hydrolysable atom or group, such as a halogen atom or an alkoxy group. It is to be understood that the siloxanes employed may be homopolymers or copolymers and that the organic groups attached to the same silicon atom may differ. The products obtained by hydrolysis are thereafter subjected to condensation in the presence of a condensing agent such as potassium hydroxide or hydrochloric acid. The viscosity of the resulting diorgano-polysiloxanes may be between 500 and 500,000 centistokes at 25° C., and is preferably between 2000 and 50,000 centistokes.

Fillers for the diorganopolysiloxanes are particularly useful if it is desired to obtain cured products endowed with good mechanical properties. They should be finely divided and various forms of silica, alumina, titanium dioxide and various varieties of carbon may be used.

The polyalkoxysilanes employed as cross-linking agents are esters of silicic acid, of the formula $Si(OR')_4$ and products of condensation resulting from the hydrolysis of these esters. In this formula, R' represents an alkyl group, for example any of the lower alkyl groups methyl, ethyl, propyl, or butyl.

The organic tin derivatives employed in combination with a chloracetic acid may be salts of dialkyl tin with organic mono- or polycarboxylic acids and more especially with saturated aliphatic acids or with acids of the benzene series. Among these salts, there may be mentioned dibutyl tin dilaurate, dibutyl tin dibenzoate, dibutyl tin adipate and dibutyl tin di(2-ethylhexanoate).

The proportion of the various agents employed may vary fairly widely in accordance with circumstances. The proportions, calculated on the weight of diorganopolysiloxane, may range from 0.1% to 10% by weight in the case of polyalkoxysilane, a sufficient proportion generally being from 1% to 5%. The chloracetic acids and organic tin derivatives may each be employed in a proportion of from 0.01% to 5%, preferably from 0.1% to 2%, again based on the weight of the diorganopolysiloxane.

Although various methods of effecting the mixing of the ingredients may be used, it is particularly advantageous first to mix one part of the diorganopolysiloxane with all or part of the filler, pigments if any, and the polyalkoxysilane. The remainder of the diorganopolysiloxane and any filler not added in the first mixing are mixed together with all the accelerators, whereafter the two compositions so made are rapidly mixed together. Obviously one or more diorganopolysiloxanes may be employed in the mixture.

For some applications, it may be advantageous to have a relatively fluid final mixture. In this case, an organic solvent is added to the separate mixtures or to one of them. Suitable solvents for this purpose are aliphatic or aromatic hydrocarbons and esters, which are liquid at ambient temperature.

The mixtures prepared by the above-described process may be used in many applications, for example for sticking various parts (silicone elastomers, metals, wood, etc.), for caulking, coating various articles, lining, protecting various supports, and preparing moulded articles, the compositions being applied by any usual means.

In the following examples, Example I illustrates the production of the diorganopolysiloxane and Examples II and III the mixing and curing in accordance with the invention:

*Example I*

A dimethylpolysiloxane oil is prepared by heating 5000 parts of octamethylcyclotetrasiloxane (M.P. 17.5° C.) with 5 parts of a 10% aqueous potassium hydroxide solution at 150° C. for 3½ hours in an atmosphere of nitrogen. An oil is obtained, of which the viscosity at the reaction temperature is 31,000 centistokes. 16.5 parts of water are added thereto in small fractions over a period of 3 hours 40 minutes. The viscosity of the liquid is then 1730 centistokes at 150° C. The product is allowed to cool for 15 hours, whereafter the potassium hydroxide is neutralised by agitation with 50 parts of silica marketed under the name Hi-Sil X–303. The liquid obtained, which has a viscosity of 13,400 centistokes at 25° C., is transferred to a boiling vessel, fitted with a water-cooled condenser, where it is heated at about 195–200° C. while passing a current of nitrogen through it in order to remove the volatile products. At the outlet of the condenser, there are collected 655 parts of liquid, while there remain in the boiler 4345 parts of an oil having a viscosity of 21,000 centistokes at 25° C. and a hydroxy group content of 0.15% by weight.

*Example II*

There are mixed for 2 hours at a temperature of 20° C. in a malaxator 100 parts of dimethylpolysiloxane oil prepared as in Example I, 25 parts of silica, "Celite Superfloss" brand, and 5 parts of "Aerosil" silica of combustion. The product is thereafter heated for 2 hours at 135–140° C., the volatile products being driven off by a current of nitrogen. A paste (A) is thus obtained.

50 parts of this paste (A) are transferred to an apparatus provided with a stirrer, every precaution being taken to avoid humidity. 2.5 parts of ethyl orthosilicate and 0.25 part of chromium oxide as colouring agent are added. The mixture is stirred for 15 minutes and the paste (B) obtained is kept in a closed receptacle.

Separately, 50 parts of composition (A) are malaxated at 20° C. with 0.25 part of trichloracetic acid and 0.25 part of dibutyl tin dilaurate. After stirring for 20 minutes, the paste (C) obtained is removed from the apparatus and kept free from moisture.

10 parts of composition (B) are mixed on a glass plate with 10 parts of paste (C) for 45 seconds, whereafter the paste obtained is introduced into a metal mould and left in the ambient air.

After 3 minutes, the mass is no longer sticky and one minute later it can readily be removed from the mould.

If a composition similar to (C) but containing no trichloracetic acid is employed, it is necessary to wait for 2 hours 30 minutes before the mass has solidified.

On the other hand by using a composition similar to (C) but containing no dibutyl tin dilaurate, curing is not complete at the end of 2 hours.

*Example III*

A trial similar to that of Example II is carried out, using for the preparation of the paste (C) 50 parts of composition (A) which are malaxated with 1 part of dichloracetic acid and 1 part of dibutyl tin dilaurate. When products (B) and (C) are mixed, a paste is obtained which, on introduction into a mould, is solidified after 3 minutes.

I claim:

Process for the production of a cured diorganopolysiloxane product, comprising mixing together two compositions, one containing a hydroxy-terminated linear dimethylpolysiloxane having a viscosity at 25° C. between 2000 and 50,000 centistokes mixed with tetraethoxy silane and the other containing a further quantity of said dimethylpolysiloxane mixed with a combined accelerator consisting of about equal parts by weight of trichloracetic acid and dibutyl tin dilaurate, the tetraethoxy silane and the combined accelerator being respectively present in proportions of 1 to 5% and 0.2 to 4% by weight, each based on the total dimethyl-polysiloxane, at least one of said compositions containing an inert filler, and allowing the curing to take place in humid air at 15 to 30° C.

References Cited by the Examiner

UNITED STATES PATENTS 2,982,755  5/1961  Kidwell et al. _____ 260—37

FOREIGN PATENTS 216,878  8/1958  Australia.
1,200,680  6/1959  France.

MORRIS LIEBMAN, *Primary Examiner.*

ABRAHAM RIMENS, LESLIE H. GASTON, *Examiners.*